No. 653,421. Patented July 10, 1900.
W. LOREY.
FILTER.
(Application filed Aug. 22, 1899.)
(No Model.) 6 Sheets—Sheet 1.

WITNESSES:

INVENTOR
WM. LOREY
BY
Charles N. Butler
ATTORNEY

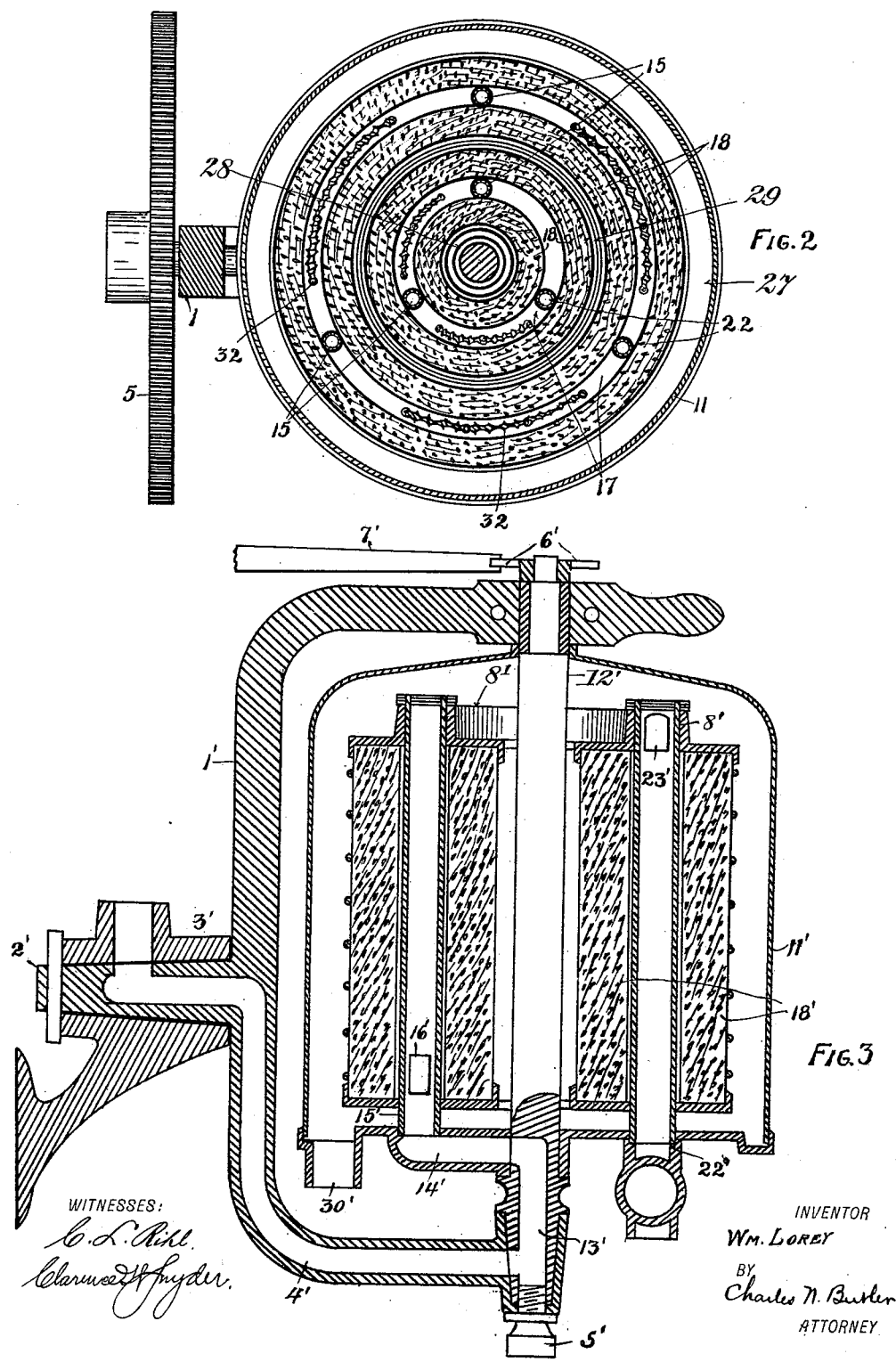

No. 653,421. Patented July 10, 1900.
W. LOREY.
FILTER.
(Application filed Aug. 22, 1899.)
(No Model.) 6 Sheets—Sheet 3.

WITNESSES:
INVENTOR
WM. LOREY
BY
Charles N. Butler
ATTORNEY.

No. 653,421.

W. LOREY.
FILTER.
(Application filed Aug. 22, 1899.)

Patented July 10, 1900.

(No Model.)

6 Sheets—Sheet 4.

WITNESSES:

INVENTOR

WM. LOREY
BY
Charles N. Butler
ATTORNEY.

No. 653,421. Patented July 10, 1900.
W. LOREY.
FILTER.
(Application filed Aug. 22, 1899.)
(No Model.) 6 Sheets—Sheet 5.

WITNESSES:
INVENTOR
WM. LOREY
BY
Charles N. Butler
ATTORNEY.

No. 653,421. Patented July 10, 1900.
W. LOREY.
FILTER.
(Application filed Aug. 22, 1899.)
(No Model.) 6 Sheets—Sheet 6.

WITNESSES:

INVENTOR
WM. LOREY
BY
Charles N. Butler
ATTORNEY.

UNITED STATES PATENT OFFICE.

WILLIAM LOREY, OF PHILADELPHIA, PENNSYLVANIA.

FILTER.

SPECIFICATION forming part of Letters Patent No. 653,421, dated July 10, 1900.

Application filed August 22, 1899. Serial No. 728,090. (No model.)

*To all whom it may concern:*

Be it known that I, WILLIAM LOREY, residing in the city of Philadelphia, State of Pennsylvania, have invented certain new and useful Improvements in Filters, of which the following is a specification.

The primary object of my invention is to produce a filter of increased capacity with ready facility for removing the impure matter separated from the water and cleaning the filter.

Figure 1:
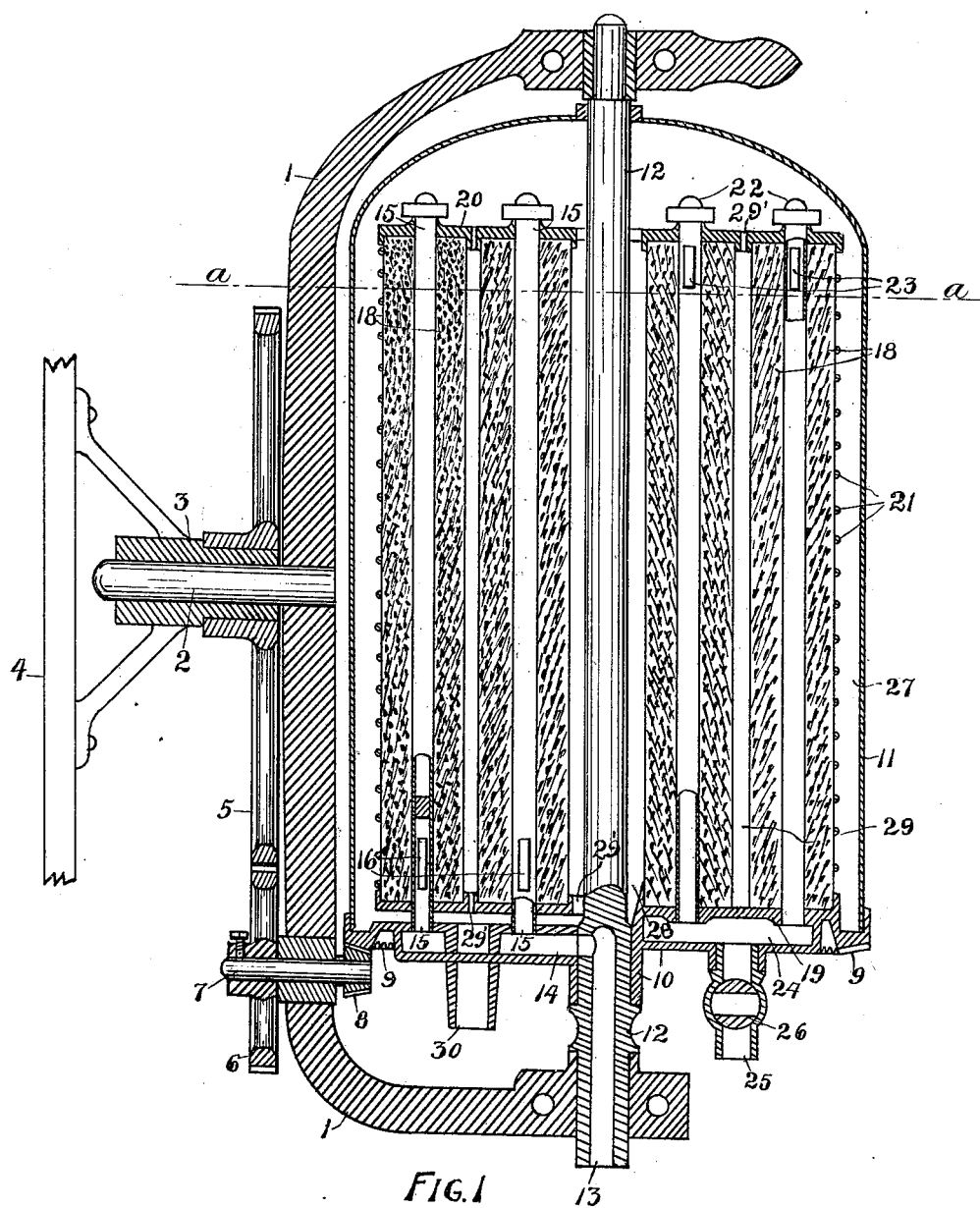
Figure 4:
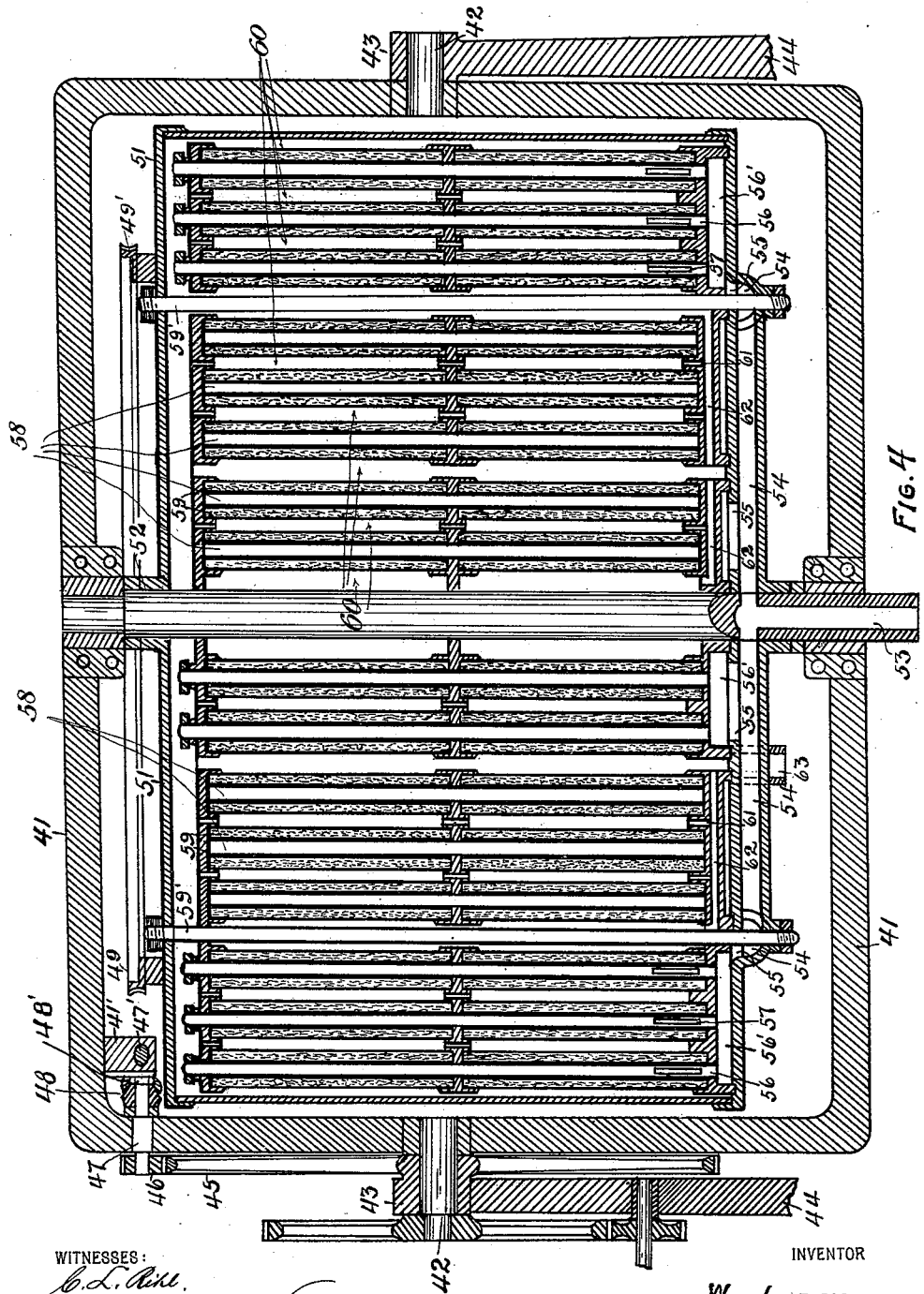
Figure 5:
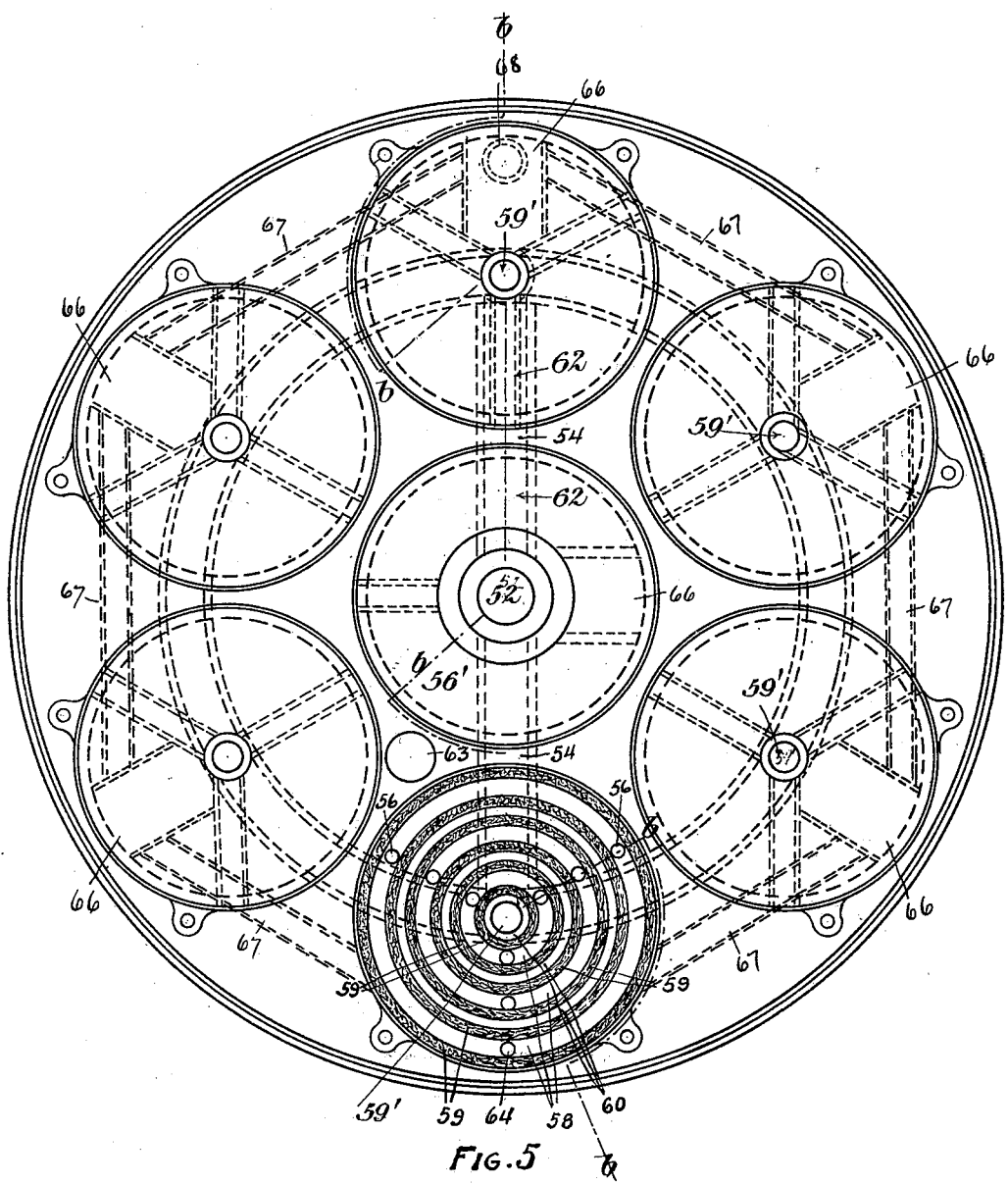
Figure 6:
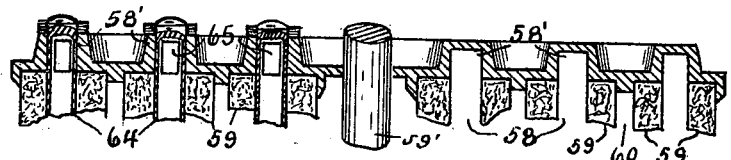
Figure 7:
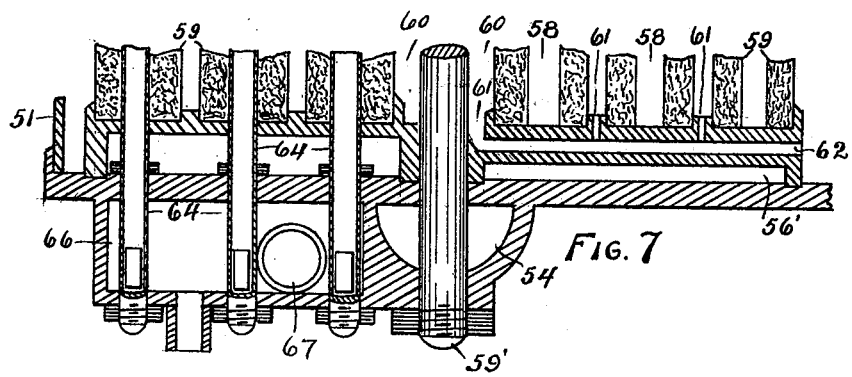
Figure 8:
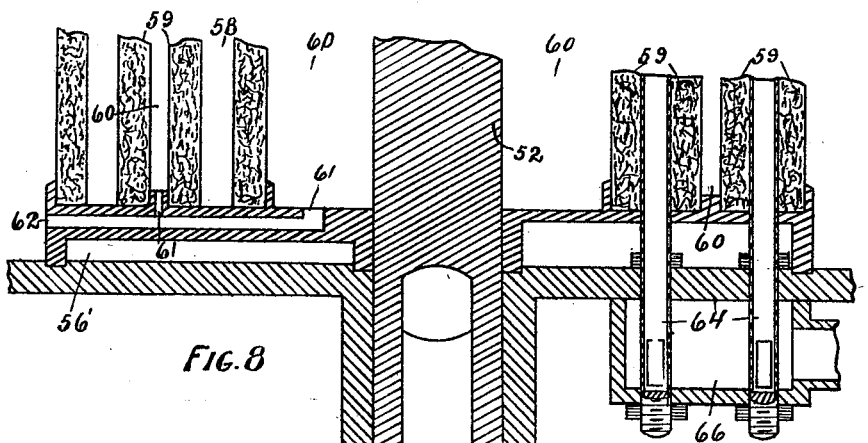
Figure 9:
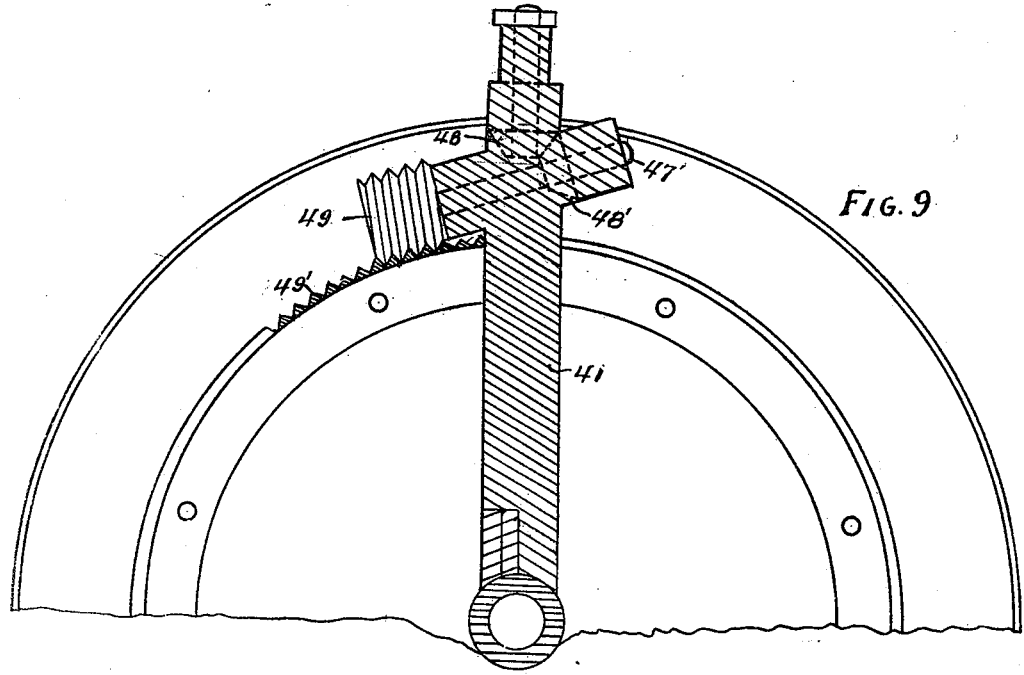
Figure 10:
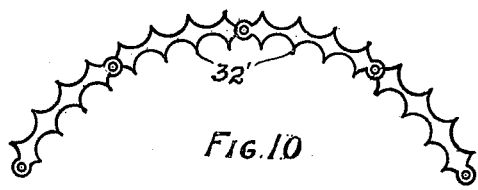
Figure 11:
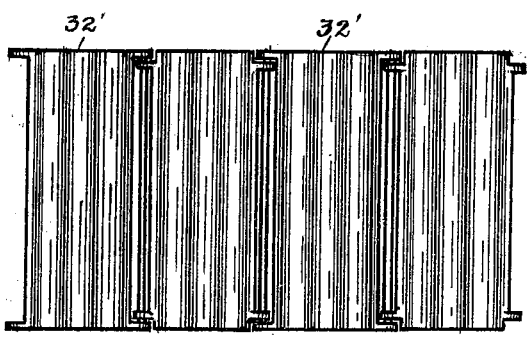

In the accompanying drawings, Figure 1 is a vertical sectional view illustrating the principle of my invention. Fig. 2 is a horizontal sectional view of the construction illustrated in Fig. 1, taken on the line *a a* thereof. Fig. 3 is a vertical sectional view of a simplified form of my invention, showing a modification in the mode of supplying water thereto. Fig. 4 is a vertical sectional view showing the principle of my invention applied to a compound form of filter, taken on the line *b b*, Fig. 5. Fig. 5 is a plan view showing the relative positions of the cylinders comprised in my compound filter and the conduits therefor. Fig. 6 is a partial sectional view showing the preferred form of cap for the cylinders and the connections therefor. Fig. 7 is a partial sectional view showing a detail of the base of the outer cylinders and the connections therefor. Fig. 8 is a partial sectional view showing a detail of the base of the central cylinder and the passages therefor. Fig. 9 is a plan view, partially in section, illustrating the worm-gear for revolving the filter. Fig. 10 is a plan view, and Fig. 11 is a vertical elevation illustrating a form of device for scouring the filter.

Referring to Figs. 1 and 2 of the drawings, the frame 1 is supported upon a shaft 2, journaled in a bearing 3 of a bracket 4. A gear-wheel 5 is fixed on the bracket and engages with a second gear-wheel 6, fixed to the outer end of a shaft 7, journaled in the frame and having a bevel-gear wheel 8 fixed on the inner end thereof. The gear-wheel 8 engages with a gear-track 9, secured to the base 10 of the filter-casing 11. The casing 11 is fixed upon a shaft 12, journaled in the frame 1.
The shaft 12 is cored out to provide the conduit 13, leading to the chamber 14 in the base of the casing, which chamber communicates with two sets of tubes 15. The tubes 15 are provided with apertures 16, above which they are closed, forming passages to the chambers 17, located between the concentric cylindrical diaphragms 18, of stone or other suitable porous filtering material. The cylinders 18 are supported upon the seats 19 and are covered by the caps 20, which close the chambers 17. The cylinders are wrapped with wire 21 to strengthen them or are otherwise suitably sustained. A second set of tubes 22, having apertures 23 in their upper ends, are located in the chambers 17 and communicate with a chamber 24, having an outlet 25, controlled by a cock 26. The chambers 27, 28, and 29, having the apertures 29', communicate with an outlet 30. Water flows through the channel 13 into the chamber 14, passing thence through the tubes 15 and passages 16 into the chambers 17. It then passes through the cylindrical stones 18 into the chambers 27, 28, and 29, from which it is drawn off through the outlet 30. The impurities rising to the tops of the chambers 17 pass off through the apertures 23, the tubes 22, the chamber 24, and the outlet 25. To clear the filter of deposits of impure matter, a flexible fabric 32, formed as by hinging together sections 32', made of metal or other material having a roughened surface, is placed in the chambers 17, whose walls are scoured thereby by oscillating the filter. The chain or hinged fabric may be replaced by pebbles or any other suitable scouring device. To oscillate the filter, the handle of the frame 1 is grasped and the filter is turned about its horizontal axis. The fixed gear-wheel 5 then revolves or oscillates the gear-wheels 6 and 8, causing the filter to turn upon its vertical axis. The scouring devices are thus caused to rub the walls of the chambers in which they are located, thus cleansing the filter.

Referring to Fig. 3 of the drawings, the principle of my invention is here applied to a construction in which the frame 1', having a shaft 2', journaled in a bearing 3', is provided with a conduit 4', leading to the conduit 13', formed in the shaft 12', which is journaled in the frame and has arms 6' fixed thereon, which strike against a fixed arm 7' when the frame is revolved on its horizontal axis, thus causing the vertical axis and the filtering apparatus supported thereby to revolve. A screw-plug 5' closes the bottom of the conduit 13' and locks the frame to the shaft 12', so that their conduits may be held in registration. Water flows through the conduits 4' and 13' into the chamber 14', thence through the tubes 15' and apertures 16' into a single chamber between the stones 18'. From the chamber between the stones 18' the water filters through these stones and passes off through the outlet 30'. The lighter impurities in the water contained in the chamber between the stones 18' rise to the top of the water which fills the chamber and circulating in the channel 8' at the top of the chamber escape through the passage 23' in the tube 22', which communicates with the channel 8'. To clean the filter, the plug 5' is removed and the frame is turned upon its horizontal axis. As the frame revolves, the radiating arms 6' strike the fixed arm 7', thus revolving the filter upon its vertical axis and scouring the walls, as previously described.

Referring to Figs. 4 to 9, inclusive, illustrating the principle applied to a compound construction, the frame 41 is supported upon the shafts 42, journaled in the bearings 43 of the columns 44. A gear-wheel 45 is fixed upon one of the columns and engages with a second gear-wheel 46, fixed to the outer end of a shaft 47, which is journaled in the frame and has a bevel gear-wheel 48 fixed on the inner end thereof. The gear-wheel 48 engages with a second gear-wheel 48', fixed to a shaft 47', which is journaled in the bearing 41', supported by the frame 41. A worm 49 on the shaft 47' engages with a rack 49', secured to the casing 51. (See Fig. 9.) The casing is fixed to the shaft 52, which is journaled in the frame. A number of separate filters are formed by arranging concentric diaphragms 59 about the shaft 52 and the shafts 59'. The shaft 52 is cored out to form the conduit 53, communicating with the chambers or channels 54. Passages 55 lead from the channels 54 to the chambers 56'. The chambers 56' communicate by the tubes 56 and the apertures 57 therein with the channels 58 between the respective pairs of concentric cylindrical stones 59, through which water filters into the chambers 60, escaping thence through the apertures 61 and passages 62 to an outlet or outlets 63. The impure matter passes off through a second set of tubes 64, with apertures 65 at the tops thereof, within the channels 58. The lower ends of these tubes extend into chambers 66, connected by conduits 67, through which the impurities pass to the escape-passages 68.

In constructing my filter I prefer to employ the form of cap illustrated in Figs. 3 and 6, in which channels 8' and 58' are formed in the caps, and the respective apertures 23' and 65 are located therein. By this arrangement the impurities may rise above the surfaces of the stones, thus reducing the deposits that tend to form thereon, which obstruct the filtering operations.

Having described my invention, I claim—

1. In a filter, a revoluble frame, a casing revoluble within said frame, a pair of concentric diaphragms within said casing, a chamber between said diaphragms, a passage for conducting water to said chamber, and a passage for conducting impurities from said chamber, substantially as specified.

2. In a filter, a pair of concentric diaphragms, means for strengthening said diaphragms, a chamber located between said diaphragms, a cap for said diaphragms and chamber, a base for said diaphragms and chamber, a passage for conducting water to said chamber, and a separate open passage for conducting impure matter from said chamber, substantially as specified.

3. In a filter, a frame, a shaft revoluble in said frame, a casing fixed upon said shaft, a chamber within said casing, a channel within said shaft leading to said chamber, a pair of diaphragms, a chamber between said diaphragms, a water-passage leading from said first to said second chamber, and a passage for conducting impurities from said second chamber, substantially as specified.

4. In a filter, a pair of concentric porous diaphragms, a chamber located between said diaphragms, a cap having a channel formed therein covering said chamber, a base for supporting said diaphragms and closing said chamber, a tube for supplying water to said chamber, and a tube for receiving the overflow leading from said chamber, substantially as specified.

5. In a filter, a frame having a conduit therein, an axle having a conduit therein journaled in said frame, a casing having a chamber therein communicating with said conduits, a pair of concentric diaphragms, a chamber between said diaphragms, a passage leading from said casing-chamber to said diaphragm-chamber, and a passage for carrying off the overflow from said diaphragm-chamber, substantially as specified.

6. In a filter, a pair of concentric stones, a base upon which said stones are supported, a chamber between said stones, a cap having a channel therein for covering said stones and closing said chamber, a tube passing through said base for supplying water to said chamber, a tube having an inlet located in said channel for carrying off the overflow from said chamber, and a scouring device in said chamber, substantially as specified.

7. In a filter, a bearing, a shaft journaled in said bearing, a frame fixed to said shaft, a shaft and a casing thereon journaled in said frame, a fixed gear-wheel, a shaft and a gear-wheel thereon journaled in said frame and driven by said first-named gear-wheel, a gear-track fixed on said casing, and gearing connecting said gear-track with said last-named shaft, substantially as specified.

8. In a filter, a casing, a series of vertical shafts supported by the top and bottom of said casing, a filtering apparatus comprising a series of cylindrical diaphragms arranged in pairs, a cap and a base for each series of diaphragms centered upon said vertical shafts, one or more tubes having apertures therein between each of said pairs of diaphragms, a chamber between each of said pairs of diaphragms communicating with said tubes, a second chamber communicating with said tubes for supplying water to said first chamber, and chambers for receiving water that filters through said diaphragms, substantially as specified.

9. In a filter, a casing, a series of vertical shafts supported by the top and bottom of said casing, a filtering apparatus comprising a series of cylindrical diaphragms arranged in pairs, a cap and a base for each of said series of diaphragms centered upon each of said vertical rods, one or more tubes having apertures therein between each of said pairs of diaphragms, one or more chambers between each of said pairs of diaphragms communicating with said tubes, a second chamber communicating with said tubes for supplying water to said first chambers, a tube between each of said pairs of diaphragms having an aperture near the top thereof for receiving the overflow or impurities, and passages for conducting away the overflow from said second tubes, substantially as specified.

In testimony whereof I have signed my name to this specification in the presence of two subscribing witnesses.

WILLIAM LOREY.

Witnesses:
THOMAS S. GATES,
C. N. BUTLER.